US009069690B2

(12) United States Patent
Hildesheim et al.

(10) Patent No.: US 9,069,690 B2
(45) Date of Patent: Jun. 30, 2015

(54) CONCURRENT PAGE TABLE WALKER CONTROL FOR TLB MISS HANDLING

(75) Inventors: Gur Hildesheim, Haifa (IL); Chang Kian Tan, Bayan Lepas (MY); Robert S. Chappell, Portland, OR (US); Rohit Bhatia, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 13/613,777

(22) Filed: Sep. 13, 2012

(65) Prior Publication Data

US 2014/0075123 A1    Mar. 13, 2014

(51) Int. Cl.
*G06F 12/10* (2006.01)

(52) U.S. Cl.
CPC ............ *G06F 12/10* (2013.01); *G06F 12/1027* (2013.01); *G06F 2212/684* (2013.01); *G06F 2212/651* (2013.01); *G06F 2212/681* (2013.01); *G06F 2212/655* (2013.01)

(58) Field of Classification Search
CPC .................... G06F 2212/684; G06F 2212/655; G06F 2212/682
See application file for complete search history.

(56) References Cited

U.S. PATENT DOCUMENTS

| 5,613,083 | A | 3/1997 | Glew et al. | |
|---|---|---|---|---|
| 5,680,565 | A * | 10/1997 | Glew et al. | 711/205 |
| 6,741,258 | B1 * | 5/2004 | Peck et al. | 345/568 |
| 6,775,747 | B2 | 8/2004 | Venkatraman | |
| 7,383,403 | B1 | 6/2008 | Barreh et al. | |
| 7,552,255 | B1 * | 6/2009 | George et al. | 710/58 |
| 2007/0005933 | A1 * | 1/2007 | Kopec et al. | 711/207 |
| 2011/0138149 | A1 * | 6/2011 | Karlsson et al. | 711/207 |
| 2013/0103923 | A1 * | 4/2013 | Pan | 711/207 |
| 2013/0326143 | A1 * | 12/2013 | Chen | 711/122 |

FOREIGN PATENT DOCUMENTS

EP    1215581 A1    6/2002

OTHER PUBLICATIONS

Hennessy et al. Computer Architecture: A Quantitative Approach. 2007. Elsevier. 4th edition. pp. 310-315, C-44.*
Bhargava et al. "Accelerating Two-Dimensional Page Walks for Virtualized Systems." Mar. 2008. ACM. ASPLOS '08. pp. 26-35.*
Intel Technology Journal, "The Tick Tock Beat of Microprocessor Development at Intel," vol. 14, Issue 3, 2010, pp. 1-30 and pp. 82-102.
Intel Corporation, "Intel® 64 and IA-32 Architectures, Software Developer's Manual, vol. 3A: System Programming Guide, Part 1," Aug. 2012, Chapter 4, pp. 4-1 to 4-45.
International Searching Authority, "Notification of Transmittal of the International Search Report and the Written Opinion of the International Searching Authority," mailed Jan. 8, 2014, in International application No. PCT/US2013/048594.
Stephen W. Keckler, et al., "Concurrent Event Handling Through Multithreading," IEEE Transactions on Computers, vol. 48, No. 9, Sep. 1999, pp. 903-916.

* cited by examiner

*Primary Examiner* — Nathan Sadler
(74) *Attorney, Agent, or Firm* — Trop, Pruner & Hu, P.C.

(57) ABSTRACT

In an embodiment, a page miss handler includes paging caches and a first walker to receive a first linear address portion and to obtain a corresponding portion of a physical address from a paging structure, a second walker to operate concurrently with the first walker, and a logic to prevent the first walker from storing the obtained physical address portion in a paging cache responsive to the first linear address portion matching a corresponding linear address portion of a concurrent paging structure access by the second walker. Other embodiments are described and claimed.

19 Claims, 8 Drawing Sheets

CONCURRENT PAGE TABLE WALKER CONTROL FOR TLB MISS HANDLING

BACKGROUND

In modern computer systems, a processor executes instructions on various data. Both the instructions and data can be obtained from a system memory. To access the system memory, a physical address is used. However, software does not directly provide physical addresses for the processor to use. Instead, hardware of the processor is used to translate a linear address received from the software into a physical address.

In certain processors, there can be processor-based structures to store frequently used or recently used translations to reduce latency. However, it is inevitable that there are so-called misses in which a translation between a requested linear address and a corresponding physical address is not present in the processor. Accordingly, a page walk process is performed to system management to obtain a translation to thus provide an appropriate physical address. While such mechanisms exist, the page walk process can be relatively time consuming, thus increasing latency of memory accesses.

DETAILED DESCRIPTION

Figure 1:
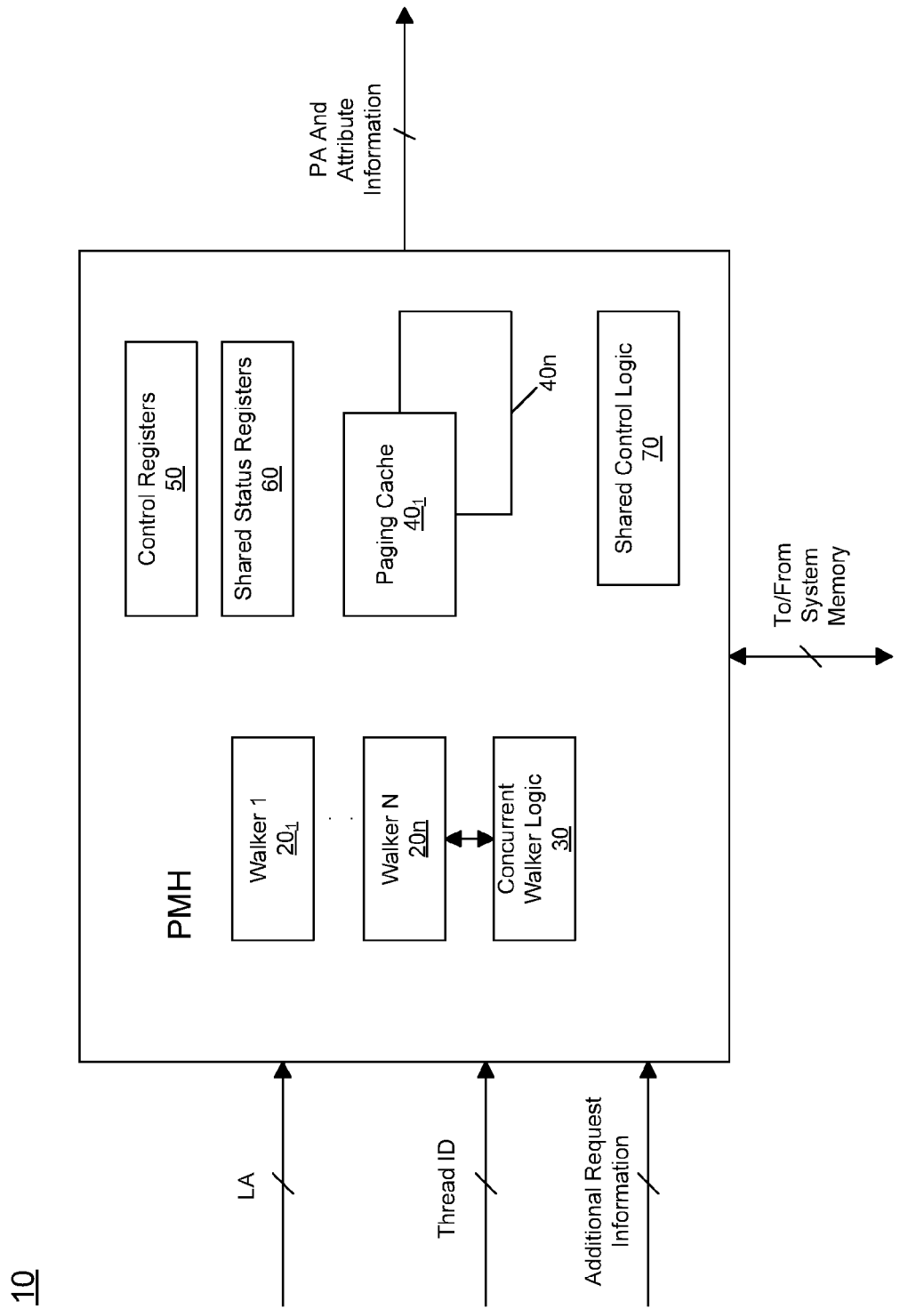
FIG. 1 is a block diagram of a page miss handler in accordance with an embodiment of the present invention.

In various embodiments, a technique is provided to enable multiple walkers of a page miss handler (PMH) to concurrently execute a walk of a set of paging structures each to obtain a translation from a linear address to a physical address. Furthermore, embodiments may provide logic to prevent one or more of the concurrent walkers from storing an entry in a paging cache for a particular translation if a concurrent walker is in the process of accessing information for a linear address that at least partially overlaps with a linear address being translated by another of the concurrent walkers. Stated another way, the cache write disabling described herein is used to ensure that multiple ways having the same data are not present in a given paging cache. While embodiments described herein provide such logic within a page miss handler itself, understand the scope of the present invention is not limited in this regard and in other embodiments other hardware, software and/or firmware may be used in implementing the concurrent walker protection described herein.

A processor in accordance with an embodiment of the present invention may be configured according to one of multiple paging modes. Regardless, in each mode a processor operates to translate a linear address to a physical address corresponding to a location in a system memory, using hierarchical paging structures. In various embodiments, a PMH of the processor may perform the process of obtaining the translation when the translation is not already present in the processor, e.g., within a translation lookaside buffer. In general, the PMH uses the upper portion of a linear address to identify a series of paging structure entries. The last of these entries identifies the physical address of the region to which the linear address translates (called the page frame). The lower portion of the linear address (called the page offset) identifies the specific address within that region to which the linear address translates. Each paging structure entry contains a physical address, which is either the address of another paging structure or the address of a page frame. In the first case, the entry references the other paging structure; in the latter, the entry maps to a page.

The first paging structure is located at a physical address stored in a configuration register such as a CR3 register. A linear address is translated using the following iterative procedure. A portion of the linear address (initially the uppermost bits) is used to obtain an entry in a paging structure (initially the one located using the value stored in the CR3 register). If that entry references another paging structure, the process continues with that paging structure and with another portion of the linear address below that just used. If instead the entry maps to a page, the process is completed. In this instance, the physical address in the entry is that of the page frame and the remaining lower portion of the linear address is the page offset within the page frame.

Referring now to FIG. 1, shown is a block diagram of a page miss handler in accordance with an embodiment of the present invention. The page miss handler may be located within a memory execution unit (MEU) of a processor. This handler may be used to effect translations from a linear address to a physical address, when such translation is not present in another structure of the processor such as a translation lookaside buffer (TLB).

As seen in FIG. 1, PMH 10 may include a plurality of constituent components and may be configured to receive an incoming linear address (LA) and a thread identifier (thread ID), along with additional request information, which may include, for example, specific information about the micro-operation (uop) associated with the translation. This information may include an opcode, reorder buffer identifier, request type (e.g., load, store, or prefetch), and a retirement flag to indicate the uop is the next operation to be retired. Note that this incoming information may be received responsive to a miss in a TLB or other caching structure that stores translation information. Thus when a translation to a physical address located in a system memory is not otherwise available to the processor, the processor logic may send the linear address (or at least the translated portion thereof) to the PMH, along with the thread ID, which corresponds to an identifier for the thread associated with the request for memory access corresponding to the linear address.

Still referring to FIG. 1, PMH 10 includes various structures. As seen, multiple walkers may be present, namely walkers $20_1$-$20_n$ (generically walker 20). In different embodiments, the number of walkers varies. In some implementations two walkers may be present while in other implementations greater numbers of walkers may be present. The walkers can execute concurrently to perform page walks for different incoming linear addresses. In some embodiments, an input buffer may be present (not shown for ease of illustration in FIG. 1) to store incoming linear addresses and thread IDs when a walker is unavailable.

As also shown in FIG. 1, a concurrent walker logic 30 may be coupled to walkers 20. In general, concurrent walker logic 30 may operate to control the page walks performed by the walkers to ensure that multiple concurrent page walks being performed do not cause the same data to be stored in different entries of a caching structure, as this could lead to logical and/or electrical issues. Further details regarding concurrent walker logic 30 will be described further below.

Still referring to FIG. 1, a plurality of paging caches $40_1$-$40_n$ may be present. Note that the number of such caches may vary depending on the paging mode and the configuration of the processor. Also in other embodiments, these paging caches may not be present, or may not be used during certain modes of operation. In general, each paging cache is configured to store a number of entries, with each paging cache associated with a different paging structure in memory to thus enable more rapid translation operations.

Additional structures are present in a PMH. Specifically as seen in the embodiment of FIG. 1, a shared control logic 70 may be used to control operations of the PMH, including page walks performed by the walkers. Other storages in addition to the paging caches also may be present. In the implementation shown, one or more control registers 50 are present. In one embodiment, these registers may include a CR3 register which stores an address that denotes a beginning paging structure in memory at which a walk is to begin. Other control or configuration registers also may be present such as a CR0, CR4, extended feature enable register long mode addressing register (EFER-LMA), extended page table pointer (EPTP) register, among others. Still other storages may be present including status storages. In the embodiment shown, a plurality of status registers 60 may be present, one or more associated with a given paging cache. In an embodiment, these status storages can store certain information regarding the caches. Still further these caches may include a field for each walker (on a per cache basis) to store an indicator to indicate whether a particular walker is enabled to store accessed information from a paging structure into the corresponding paging cache as will be described below. Note that although shown as physically (and logically) separate structures, understand that each walker may constitute various hardware such as registers, control logic and so forth.

PMH 10 may couple to a system memory which includes various paging structures. The number and size of such structures varies depending on a paging mode implemented by the processor. Further details regarding a representative paging structure hierarchy will be described further below. When a complete translation has been effected via a page walk, a physical address (PA) and corresponding attribute and other status information associated with the physical address may be output from the PMH. As one such example, this output information may be provided to a TLB for storage in a entry of the TLB to provide a linear address-to-physical address translation for faster access by the processor. Although shown at this high level in the embodiment of FIG. 1, understand the scope of the present invention is not limited in this regard.

Figure 2:
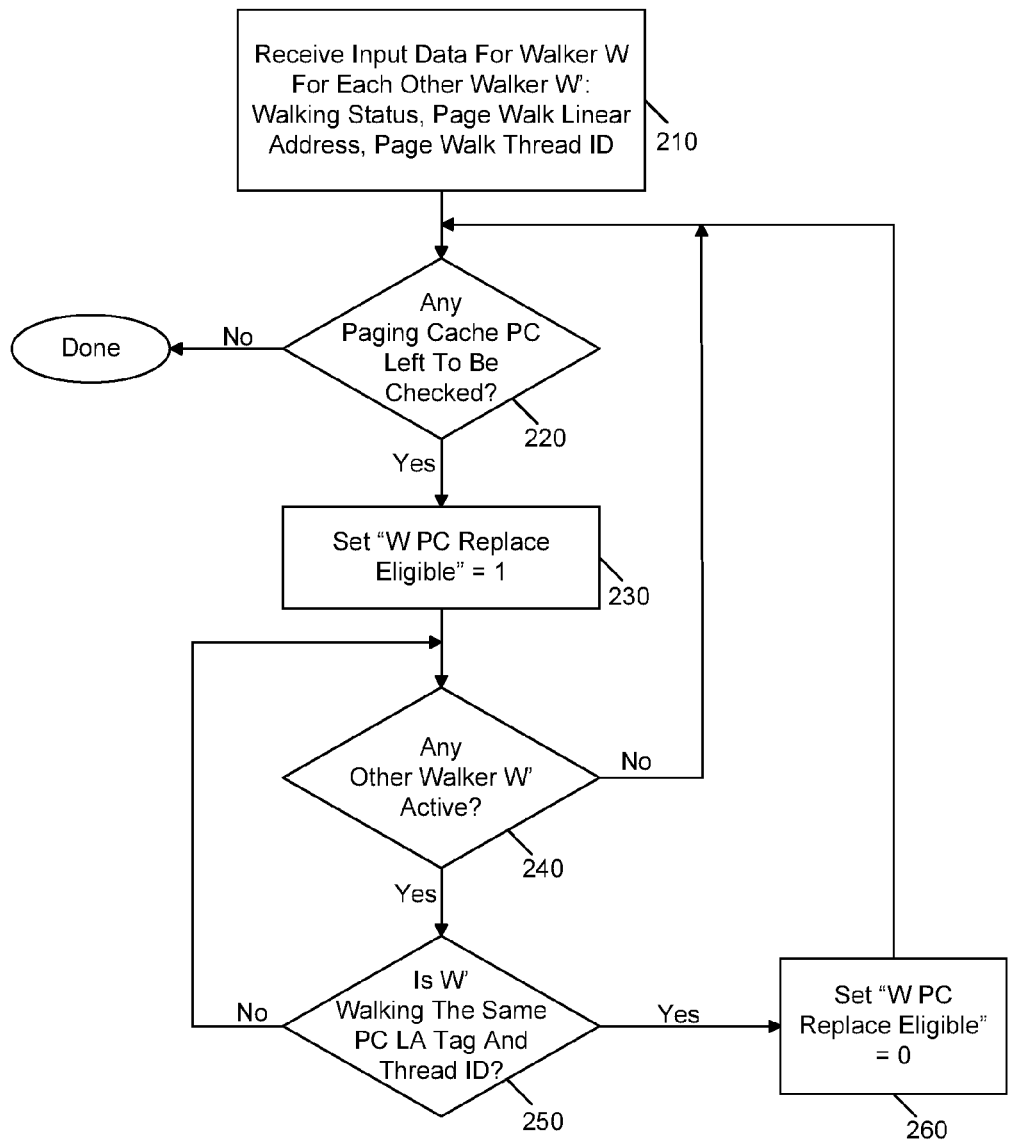
FIG. 2 is a flow diagram of a method for performing page walks in accordance with an embodiment of the present invention.

Referring now to FIG. 2, shown is a flow diagram of a method for performing page walks in accordance with an embodiment of the present invention. As shown in FIG. 2, method 200 may be executed by control logic such as the concurrent walker logic during initialization of a walker for access to obtain one or more portions of a physical address from paging structures of a memory system. That is, the method may be performed, e.g., by concurrent walker logic of the PMH, prior to enabling a walker to begin a page walk process to obtain a physical address. As seen, method 200 may begin in block 210 by receiving input data from one or more other walkers. In accordance with the discussion here, assume that walker W is the current walker being initialized to perform a page walk, and walker W' is one or more other walkers that may or may not be in the process of concurrently performing a page walk. As seen in the embodiment of FIG. 2, the input data received for each other walker may include a status of the walker (e.g., whether it is currently performing a walk, among other information), a page walk linear address (e.g., at least the portions of a linear address that correspond to various paging structures such as linear address bits 47:21) when the walker is active, and a thread identifier for the thread for which the other walker is performing the lookup access.

Referring still to FIG. 2, control next passes to diamond 220 where it can be determined whether there is any paging cache (PC) left to be checked by the current page walker. As described above, various paging caches may be present in a page miss handler or other memory subsystem location. If no such structures are left to be checked, method 200 may conclude. Otherwise, control passes to block 230 where a status indicator associated with the current paging cache may be set to indicate that a physical address obtained by the walker is eligible to replace an entry in the current paging cache. In an embodiment, this status indicator may be stored in a status storage associated with the physical cache, such as a status register or so forth. As one example, each paging cache may include a replacement eligibility status register having a plurality of fields each associated with a corresponding walker to indicate whether the given walker can perform a replacement to an entry in the paging cache. Of course other locations for this replacement indicator are possible, such as within a field of a status register for the walker itself.

Still referring to FIG. 2, control next passes to diamond 240 to determine whether any other walkers W' are active (e.g., in the process of performing a walk). If not, method 200 may conclude with the status indicator set to this replacement eligible condition such that when the walker returns with data from the paging structures or so forth, that information can be stored in a way of the given paging cache.

Otherwise, if another walker is active, control passes next to diamond 250 where it can be determined whether this active walker is walking for the same linear address tag and thread identifier as for walker W. In an embodiment, this determination may be based on bits 47:21 of the linear address. However, different portions of this linear address segment can be used in other embodiments. If the other walker is walking a different tag (or different thread identifier), no further action occurs, and accordingly control passes back to diamond 240.

Otherwise, if it is determined that these two walkers are walking the paging structures for the same tag and thread identifier, control instead passes to block 260. There the status indicator for the walker under analysis for that paging cache may be reset to zero to thus indicate that the results of the access lookup by the walker are not eligible for storage into the paging cache. This is so, as both walkers are seeking the same translation. Thus to avoid multiple ways of the paging cache having the same information, and leading to the potential situation of a paging cache lookup having multiple hits for a single tag and thread identifier, this status may be set to zero. As seen, control next passes back to diamond 220, where the analysis can be performed for another paging cache, if present. Although shown at this high level in the embodiment of FIG. 2, understand the scope of the present invention is not limited in this regard.

When a linear address is accessed, a processor determines the physical address to which it translates and whether the access should be allowed. First, lookup logic of the processor may access the TLB to determine when a TLB entry exists for the page number of the linear address and if so it may use the physical address, access rights, and other attributes from that entry. If the logic does not find a relevant TLB entry, the access request information, linear address (or at least the translated portion of it) and a thread ID can be sent to the PMH. In turn, the PMH may use the upper bits of the linear address to select an entry from an appropriate paging cache if present, and in this way shorten the length of the page walk by skipping one or more stuffed loads. If not, a full page walk may be performed.

Figure 3:
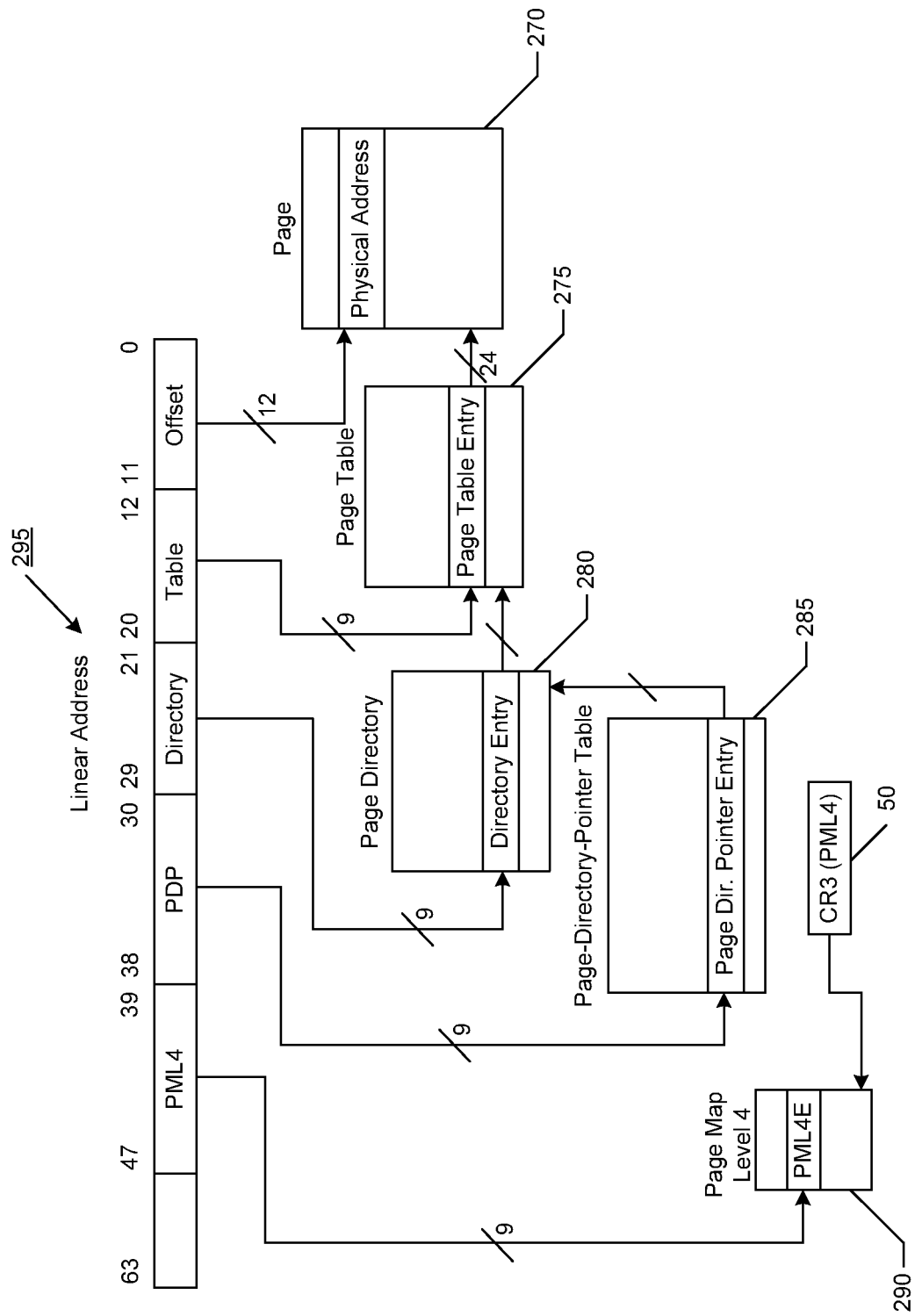
FIG. 3 is a linear address translation performed by a page miss handler in accordance with an embodiment of the present invention.

Referring now to FIG. 3, shown is a linear address translation that can be performed by a page miss handler in accordance with an embodiment of the present invention accommodating 64-bit address translations. As shown in FIG. 3, a page in a memory 270 may be addressed using a linear address 295. As shown, linear address 295 includes a number of fields to index a four-level paging structure to access a physical address in memory 270. An offset field (bits 0-11) is used to address the physical address within a page of memory 270. A page table entry (PTE) (bits 12-20) addresses a page table entry in a page table (PT) 275. A page directory entry (PDE) (bits 21-29) addresses a page directory entry in a page directory (PD) 280. A page directory pointer (PDP) (bits 30-38) addresses a page directory pointer entry in a page directory pointer table (PDPT) 285. Finally, a page map level four (PML4) pointer (bits 39-47) addresses a PML4 entry in a PML4 290. The base of PML4 290 may be accessed using a pointer stored in CR3 register 50. In such manner, a 64 bit-linear address may be used to implement a four-level paging structure to access a physical address. Of course, different paging modes may be used in different embodiments.

To being a translation process in the PMH, a PDE cache may first be accessed. In an embodiment, the PDE cache may include entries referenced by a 27-bit value, used for linear addresses for which bits 47:21 have that value. A PDE cache entry contains information from the PML4E, PDPT, and PDE used to translate the relevant linear addresses to the physical address from the PDE (the address of the page table). In addition, the PDE cache may further store various attribute and other information. The PMH can then use a matching entry to complete the translation process (locating a PTE, etc.) as if it had traversed paging structures in memory corresponding to the PDE cache entry.

If the PMH does not find a relevant PDE cache entry, it may use bits 47:30 of the linear address to select an entry from a PDPT cache. It can then use that entry to complete the translation process (locating a PDE, etc.) as if it had traversed the PDPT and the PML4 corresponding to the PDPT cache entry. In an embodiment, each PDPT cache entry is referenced by an 18-bit value and is used for linear addresses for which bits 47:30 have that value. The entry contains information from the PML4E and PDPT used to translate the linear address, namely the physical address from the PDPT (the address of the page directory), and various status and attribute information.

If the PMH does not find a relevant PDE-cache entry, or a relevant PDPT-cache entry, it may use bits 47:39 of the linear address to select an entry from a PML4 cache. In an embodiment, each PML4 cache entry is referenced by a 9-bit value and is used for linear addresses for which bits 47:39 have that value. The entry contains information from the PML4E used to translate the linear address, namely the physical address from the PML4 (the address of the page-directory-pointer table), and certain status and attribute information. The PMH can then use that entry to complete the translation process (locating a PDPTE, etc.) as if it had traversed the corresponding PML4. If the PMH does not find any paging cache entry for the linear address, it may initialize a walker to use the linear address to traverse the entire paging structure hierarchy in system memory.

In an embodiment, when the PMH initiates a walker to perform a page walk, the access to paging structures in a memory hierarchy may be by way of stuffed load operations, rather than conventional load micro-operations. As such, upon return of information for these stuffed load operations, the data may be stored in an appropriate paging cache, if a status indicator for the walker indicates that such store is allowed.

Thus assuming a miss in all the paging caches, the walker may begin by issuing a stuffed load to the PML4 paging structure. Upon return, this information and the PML4 entry can be stored into the PML4 cache and in addition can be used to access a page directory pointer table paging structure. On return, that information and the PDP entry can be stored in a PDP cache and further used to issue a stuffed load for a page directory paging structure (PDE). Upon return, that information and the PDE entry can be stored in a PDE cache, and further used to issue a stuffed load to a page table paging structure. Finally upon return of that information, the physical address bits 47:12 can be used to access a requested page in memory that includes requested information at a location in the page according to an offset of the linear address, namely LA bits 11:0.

Thus in various embodiments, a determination may be made, e.g., upon walker initiation, whether the walker is allowed to fill a paging cache, while avoiding multiple ways fill (in multiple potential ways hit). In various embodiments, this fill eligibility may be calculated for each paging cache at the beginning of a page walk. During the page walk itself, this eligibility value may then be used to determine whether a cache fill is allowed to occur. In an embodiment, this eligibility may be granted to a first walker that begins a page walk for a given address. Thus if two walkers are walking addresses with the same PDE tag, the walker that first started the walk is the eligible walker for filing the PDE cache. Also, via this technique additional latency and logic to perform a lookup replace can be avoided. That is, a paging cache can be directly written on data return without having logic perform a read of the cache before a replacement to determine that the data to be written is not already present.

Note that there is no relation between caching obtained translation information in a paging cache of the PMH, and continuing a page walk and providing a completed translation to a TLB or other processor structure. That is, even when caching of accessed information is disabled due to a concurrent walker, the accessed information is still used in performing the translation undertaken by the walker.

Referring now to Table 1, shown is pseudo code for a cache fill eligibility analysis in accordance with an embodiment of the present invention.

TABLE 1

1. Upon page walk start for Walker W:
For each Paging Cache PC:
{
SET "W PC replace eligible" = 1

TABLE 1-continued

```
For each other walker W':{
    IF (W' is walking" and (W' PC tag == W PC tag) and
    (W' thread == W thread):
        {SET "W PC replace eligible" = 0}
        }
}
2. Upon stuffed load return for paging cache PC:
    IF ("W PC replace eligible" == "0"): {DO NOT fill PC cache}
    Else: {Fill the cache}
        Thus as an example, assume presence of two walkers W0 and
W1. Assume that W0 begins a page walk. The concurrency logic may
perform the following determinations, e.g., as set forth in Table 1 above:
1. Upon page walk begin:
    a.   SET "W0 PDE replace eligible" = 1.
    b.   IF (W1 is walking) and (W0 LA [47:21] == W1 LA
         [47:21]) and (W0 thread == W1 thread),
         SET "W0 PDE replace eligible" = 0.
2. Upon PDE stuffed load return:
    a.   If ("W0 PDE replace eligible" == 0), DO NOT fill the
         PDE cache. Else, fill the PDE cache.
```

Figure 4:
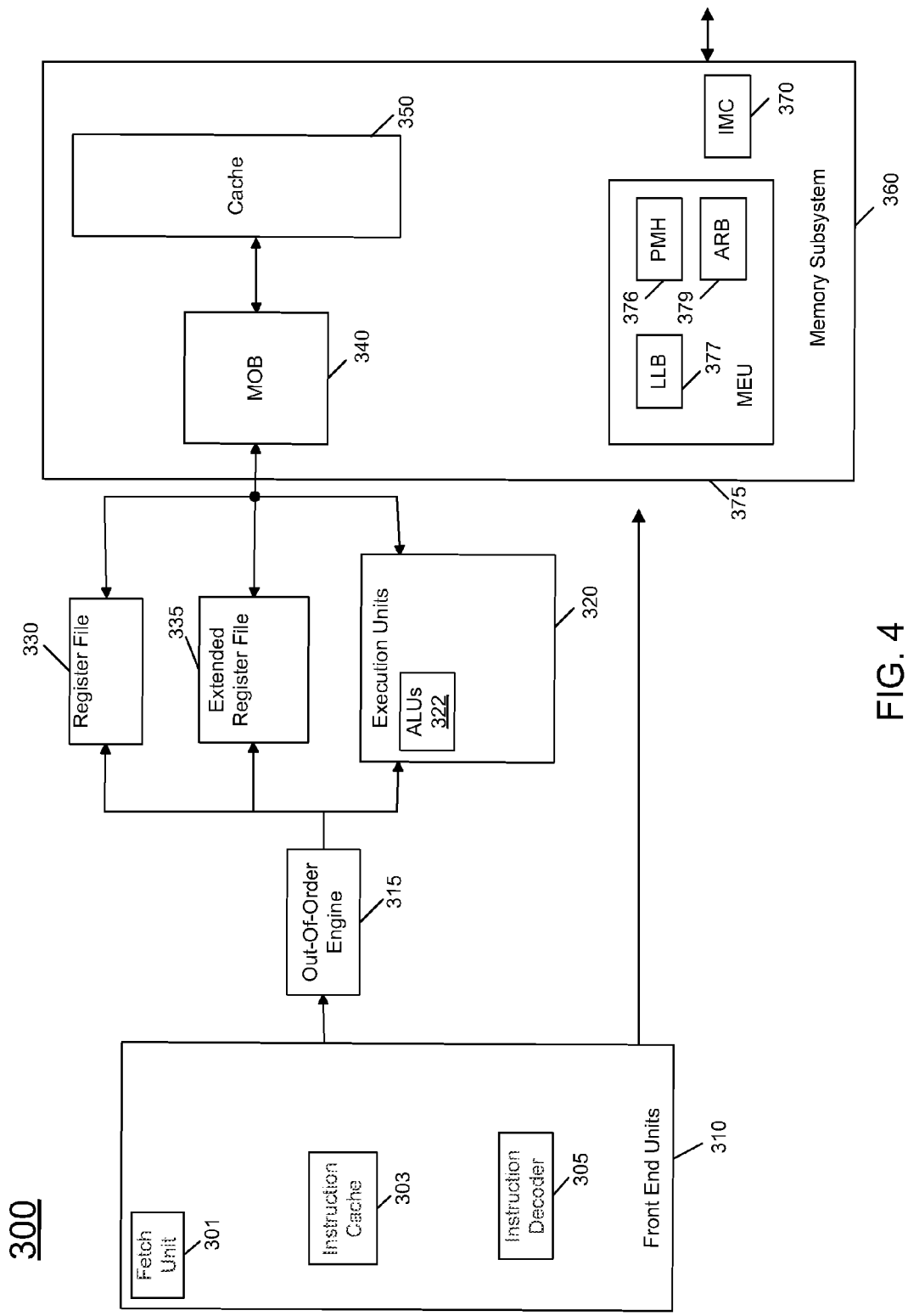
FIG. 4 is a block diagram of a processor core in accordance with one embodiment of the present invention.

Embodiments can be implemented in many different systems. For example, embodiments can be realized in a processor such as a multicore processor. Referring now to FIG. 4, shown is a block diagram of a processor core in accordance with one embodiment of the present invention. As shown in FIG. 4, processor core 300 may be one core of a multicore processor, and is shown as a multi-stage pipelined out-of-order processor. Processor core 300 is shown with a relatively simplified view in FIG. 4 to illustrate various features used in connection with concurrent page walker handling in accordance with an embodiment of the present invention.

As shown in FIG. 4, core 300 includes front end units 310, which may be used to fetch instructions to be executed and prepare them for use later in the processor. For example, front end units 310 may include a fetch unit 301, an instruction cache 303, and an instruction decoder 305. In some implementations, front end units 310 may further include a trace cache, along with microcode storage as well as a micro-operation storage. Fetch unit 301 may fetch macro-instructions, e.g., from memory or instruction cache 303, and feed them to instruction decoder 305 to decode them into primitives, i.e., micro-operations for execution by the processor.

Coupled between front end units 310 and execution units 320 is an out-of-order (OOO) engine 315 that may be used to receive the micro-instructions and prepare them for execution. More specifically OOO engine 315 may include various buffers to re-order micro-instruction flow and allocate various resources needed for execution, as well as to provide renaming of logical registers onto storage locations within various register files such as register file 330 and extended register file 335 such as by using renaming logic of the engine. Register file 330 may include separate register files for integer and floating point operations. Extended register file 335 may provide storage for vector-sized units, e.g., 256 or 512 bits per register.

Various resources may be present in execution units 320, including, for example, various integer, floating point, and single instruction multiple data (SIMD) logic units, among other specialized hardware. For example, such execution units may include one or more arithmetic logic units (ALUs) 322. Of course other execution units such as multiply-accumulate units and so forth may further be present. Results may be provided to a retirement logic, which may be implemented within a memory subsystem 360 of the processor. Various processor structures including execution units and front end logic, for example, may be coupled to a memory subsystem 360. This memory subsystem may provide an interface between processor structures and further portions of a memory hierarchy, e.g., an on or off-chip cache and a system memory. As seen the subsystem has various components including a memory order buffer (MOB) 340. More specifically, MOB 340 may include various arrays and logic to receive information associated with instructions that are executed. This information is then examined by MOB 340 to determine whether the instructions can be validly retired and result data committed to the architectural state of the processor, or whether one or more exceptions occurred that prevent a proper retirement of the instructions. Of course, MOB 340 may handle other operations associated with retirement.

As shown in FIG. 4, MOB 340 is coupled to a cache 350 which, in one embodiment may be a low level cache (e.g., an L1 cache). Memory subsystem 360 also may include an integrated memory controller 370 to provide for communication with a system memory (not shown for ease of illustration in FIG. 4). Memory subsystem 360 may further include a memory execution unit 375 that handles various operations to initiate memory requests and handle return of data from memory. For example, as shown in the embodiment of FIG. 4, MEU 375 may include a page miss handler 376 to obtain translations from LA to PA when a TLB miss occurs. In various embodiments, this PMH may include multiple page walkers and concurrent walker logic as described herein. A MEU live lock breaker (LLB) 377, and an arbitrator 379 to arbitrate among various memory requests also may be present. Further, while not shown understand that other structures such as buffers, schedulers and so forth may be present in the MEU.

From memory subsystem 360, data communication may occur with higher level caches, system memory and so forth. While shown with this high level in the embodiment of FIG. 4, understand the scope of the present invention is not limited in this regard. For example, while the implementation of FIG. 4 is with regard to an out-of-order machine such as of a so-called x86 instruction set architecture (ISA) architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

That is, in other embodiments, a processor architecture may include emulation features such that the processor can execute instructions of a first ISA, referred to as a source ISA, where the architecture is according to a second ISA, referred to as a target ISA. In general, software, including both the OS and application programs, is compiled to the source ISA, and hardware implements the target ISA designed specifically for a given hardware implementation with special performance and/or energy efficiency features.

Figure 5:
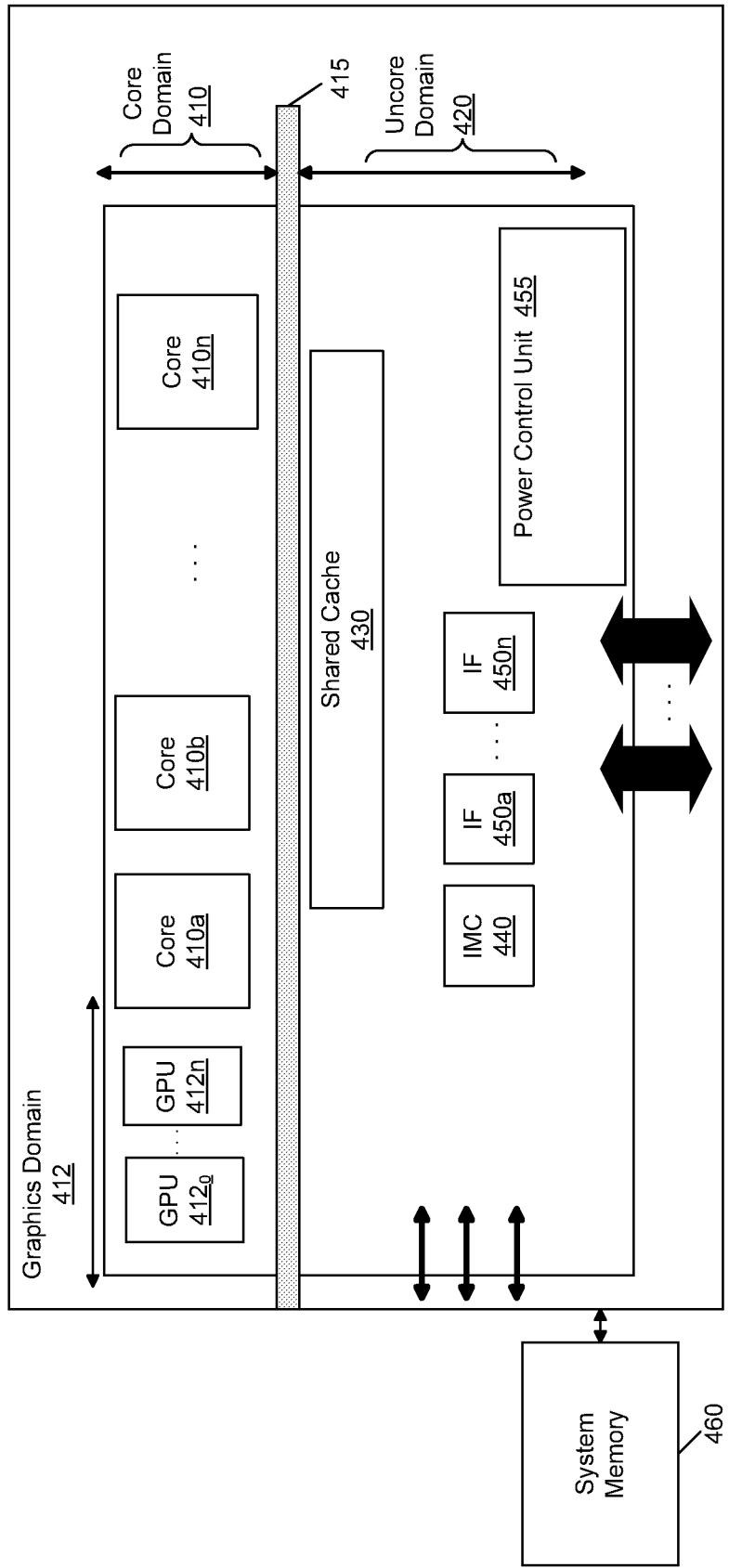
FIG. 5 is a block diagram of a processor in accordance with an embodiment of the present invention.

Referring now to FIG. 5, shown is a block diagram of a processor in accordance with an embodiment of the present invention. As shown in FIG. 5, processor 400 may be a multicore processor including a plurality of cores $410_a$-$410_n$ in a core domain 410. In one embodiment, each such core may be of an independent power domain and can be configured to operate at an independent voltage and/or frequency, and to enter turbo mode when available headroom exists, or the cores can be uniformly controlled as a single domain. In addition each core may include a memory execution unit having multiple page walkers and concurrent control logic as described herein. As further shown in FIG. 5, one or more graphics processing units (GPUs) $412_0$-$412_n$ may be present in a graphics domain 412. Each of these independent graphics engines also may be configured to operate at independent voltage and/or frequency or may be controlled together as a single domain. These various compute elements may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455 to control power consumption by the components of the processor.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
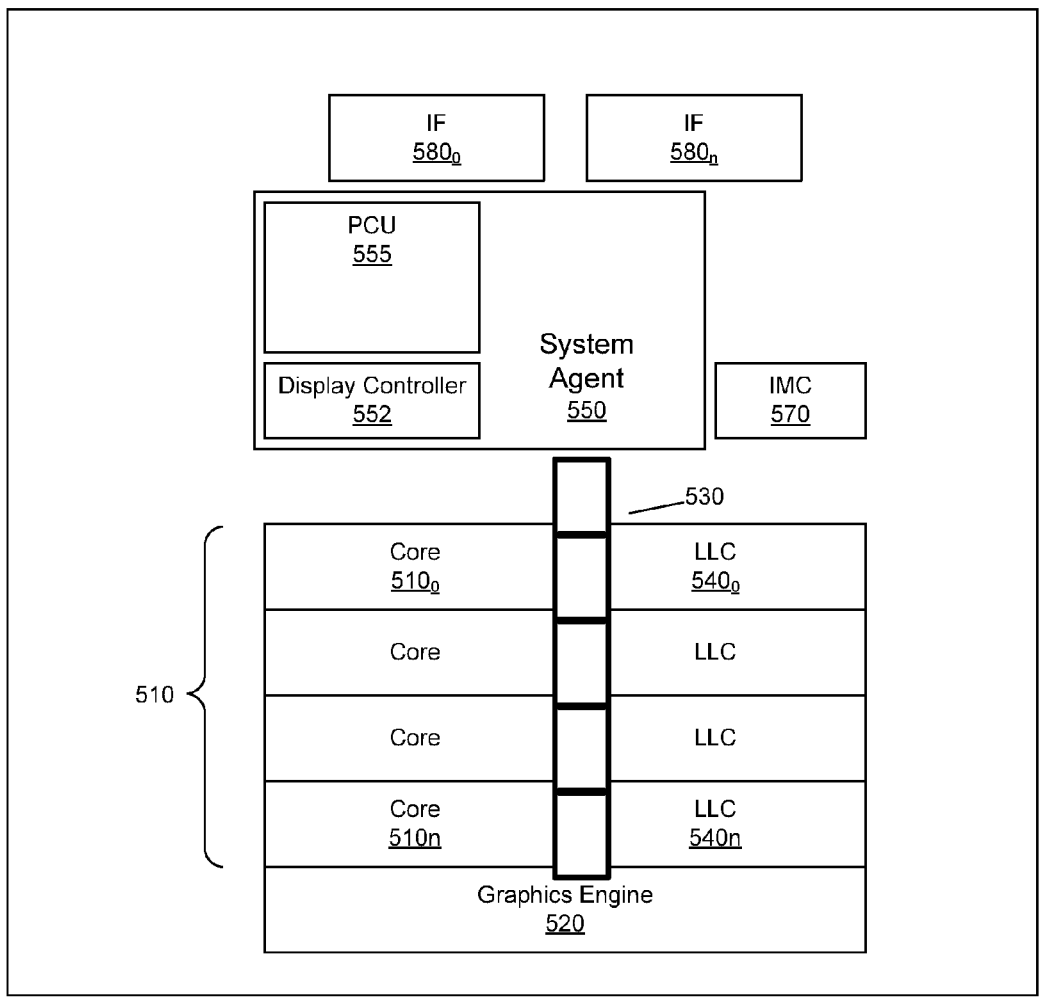
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 500 includes multiple domains. Specifically, a core domain 510 can include a plurality of cores $510_0$-$510_n$, a graphics domain 520 can include one or more graphics engines, and a system agent domain 550 may further be present. In various embodiments, system agent domain 550 may remain powered on at all times to handle power control events and power management such that domains 510 and 520 can be controlled to dynamically enter into and exit low power states. In addition, these domains can dynamically share a power budget between them based at least in part on a power bias value determined in accordance with an embodiment of the present invention. Each of domains 510 and 520 may operate at different voltage and/or power.

Note that while only shown with three domains, understand the scope of the present invention is not limited in this regard and additional domains can be present in other embodiments. For example, multiple core domains may be present each including at least one core. In this way, finer grained control of the amount of processor cores that can be executing at a given frequency can be realized.

In general, each core 510 may further include low level caches in addition to various execution units such as a memory execution unit having multiple page walkers and concurrent control logic, and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550.

In the embodiment of FIG. 6, system agent domain 550 may include display controller 552 which may provide control of and an interface to an associated display. As further seen, system agent domain 550 may include a power control unit 555.

As further seen in FIG. 6, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with a Intel® Quick Path Interconnect (QPI) protocol may also be provided. Although shown at this high level in the embodiment of FIG. 6, understand the scope of the present invention is not limited in this regard.

Figure 7:
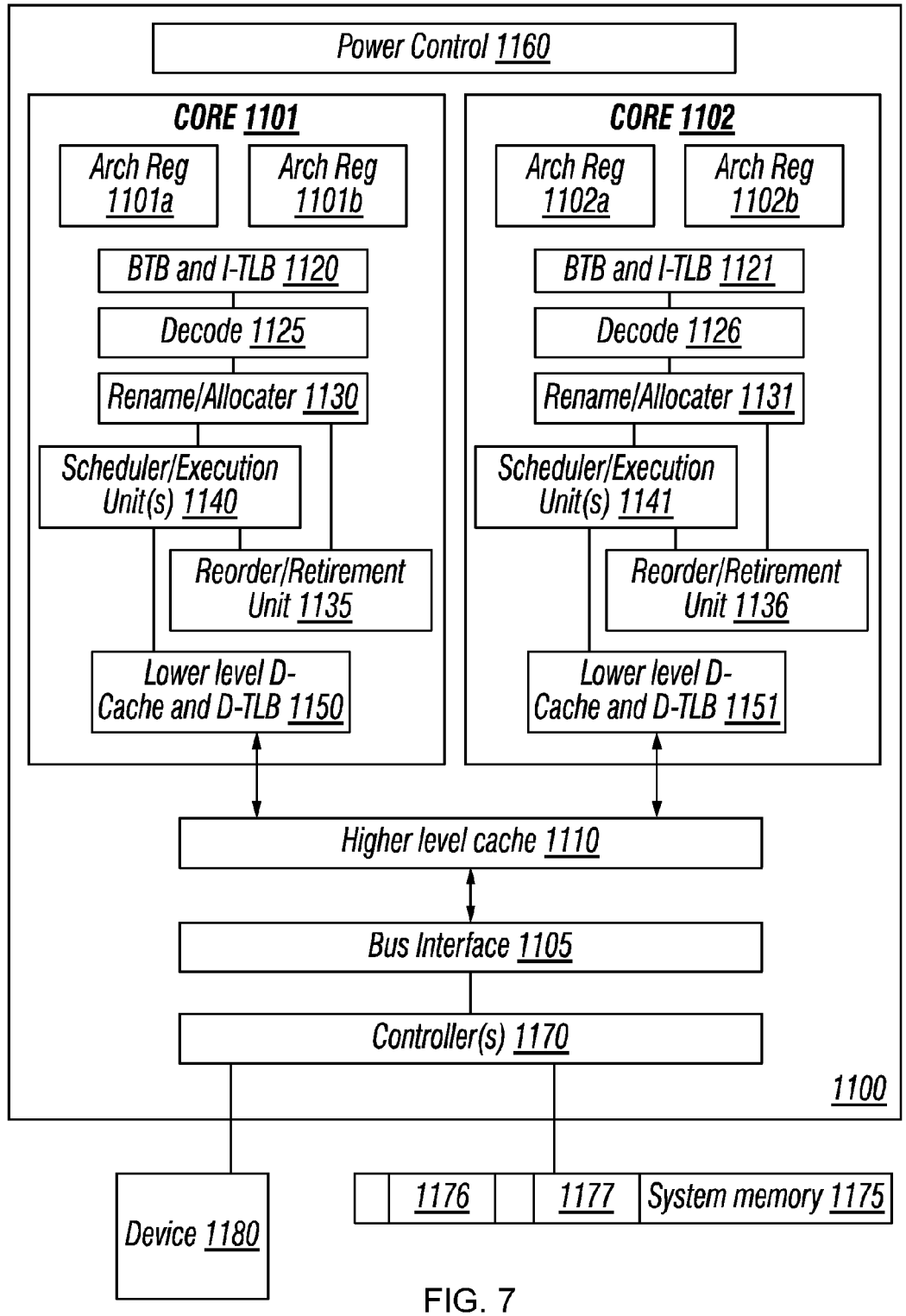
FIG. 7 is a block diagram of an embodiment of a processor including multiple cores.

Referring to FIG. 7, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 7, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101*a*, a second thread is associated with architecture state registers 1101*b*, a third thread may be associated with architecture state registers 1102*a*, and a fourth thread may be associated with architecture state registers 1102*b*. Here, each of the architecture state registers (1101*a*, 1101*b*, 1102*a*, and 1102*b*) may be referred to as processing elements, thread slots, or thread units, as described above. As illustrated, architecture state registers 1101*a* are replicated in architecture state registers 1101*b*, so individual architecture states/contexts are capable of being stored for logical processor 1101*a* and logical processor 1101*b*. In core 1101, other smaller resources, such as instruction pointers and renaming logic in allocator and renamer block 1130 may also be replicated for threads 1101*a* and 1101*b*. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 7, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 8:
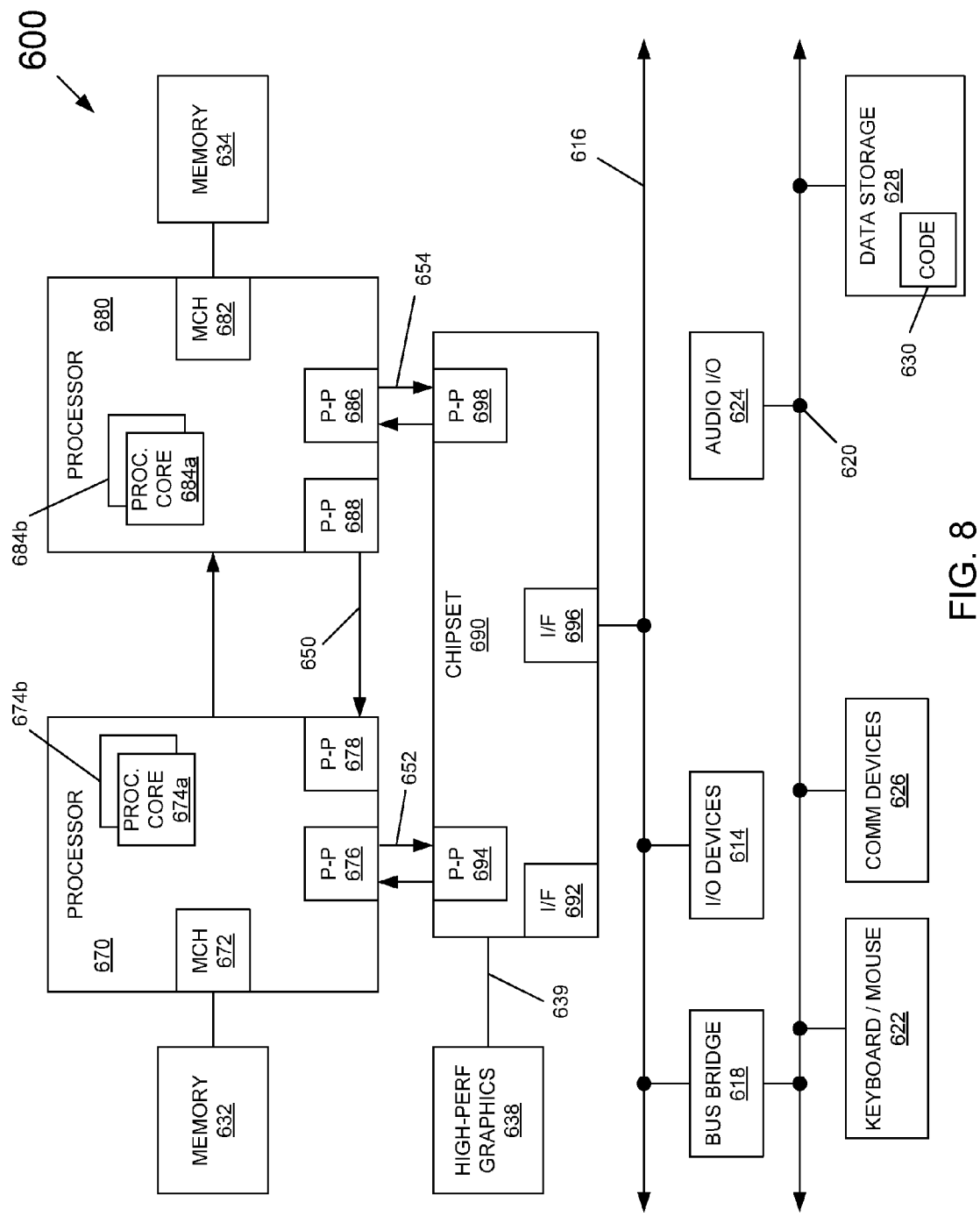
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674a and 674b and processor cores 684a and 684b), although potentially many more cores may be present in the processors. Each of the processors can include multiple walkers and control logic to prevent concurrent walkers from storing the same information in different entries of a paging cache.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, Ultrabook™, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
at least one execution unit to execute instructions; and
a page miss handler including a plurality of paging caches and a first walker structure to receive, responsive to a miss in a translation lookaside buffer (TLB) of the processor, at least a portion of a first linear address and to obtain a corresponding portion of a physical address from one or more paging structures stored in a system memory, a second walker structure to operate concurrently with the first walker structure, and a concurrent walker logic to prevent the first walker structure from storing the obtained physical address portion in one of the paging caches responsive to the first linear address portion matching a corresponding linear address portion of a concurrent paging structure access by the second walker structure, wherein the first walker structure is to access a first paging structure using a first segment of the first linear address portion and a value of a control register and to store a first accessed entry from the first paging structure in a first paging cache, based on a state of a first field of a status register associated with the first walker structure and to access a second paging structure using the first accessed entry and a second segment of the first linear address portion and to store a second accessed entry from the second paging structure in a second paging cache, based on a state of a second field of the status register associated with the first walker structure.

2. The processor of claim 1, wherein the concurrent walker logic is to enable a physical address portion obtained by the second walker structure to be stored in the one of the paging caches.

3. The processor of claim 2, wherein the concurrent walker logic is to enable the first walker structure to store the obtained physical address portion in the one of the paging caches when a thread identifier associated with the first linear address does not match a thread identifier associated with the corresponding linear address portion of the concurrent paging structure access by the second walker structure.

4. The processor of claim 3, wherein the first linear address portion comprises bits 47:21.

5. The processor of claim 2, wherein the concurrent walker logic is to prevent the first walker structure from storing the obtained physical address portion in the one of the paging caches when a thread identifier associated with the first linear address matches a thread identifier associated with the corresponding linear address portion of the concurrent paging structure access by the second walker structure.

6. The processor of claim 1, wherein the page miss handler comprises the status register associated with the first paging cache, the status register including a plurality of fields each to indicate whether a corresponding walker structure is enabled to store an obtained physical address portion in the first paging cache.

7. The processor of claim 6, wherein the concurrent walker logic is to set the first field of the status register to indicate that the first walker structure is enabled to store the obtained physical address portion when the first linear address portion does not match a linear address portion of any concurrent paging structure access.

8. The processor of claim 7, wherein the first walker structure is to directly store the obtained physical address portion in the first paging cache when the first field is set.

9. The processor of claim 7, wherein the first walker structure is prevented from storing the obtained physical address portion in the first paging cache when the first field is not set.

10. The processor of claim 7, wherein the first walker structure is to further provide the obtained physical address portion to the TLB of the processor.

11. A method comprising:
  initializing a first walker of a page miss handler of a processor to perform a page walk to determine a physical address for a linear address; and
  setting a first status indicator in a first field of a status register associated with a first paging cache, the status register including a plurality of fields each associated with one of a plurality of walkers of the page miss handler, the first field associated with the first walker to indicate that the first walker is enabled to store a portion of a physical address obtained in an entry of the first paging cache if another walker of the page miss handler is not concurrently performing a page walk for the linear address, and otherwise setting the first status indicator to indicate the first walker is not enabled to store the obtained physical address portion, wherein the first walker is to access a first paging structure using a first portion of the linear address and a value of a control register and to store a first accessed entry from the first paging structure in the first paging cache, based on the status indicator in the first field of the status register associated with the first walker and to access a second paging structure using the first accessed entry and a second portion of the linear address and to store a second accessed entry from the second paging structure in a second paging cache, based on a status indicator in a second field of the status register associated with the first walker.

12. The method of claim 11, further comprising initializing the first walker responsive to a miss in a translation lookaside buffer (TLB) of the processor.

13. The method of claim 12, further comprising determining if an entry is present in the first paging cache using a first portion of the linear address, and if so, accessing a page table in a system memory coupled to the processor using the entry and the second portion of the linear address.

14. The method of claim 13, further comprising generating a physical address using the entry, an entry from the page table, and a third portion of the linear address, and providing the physical address to the TLB for storage in an entry of the TLB indicated by the linear address.

15. The method of claim 14, further comprising accessing a page of the system memory using the physical address.

16. A system comprising:
  a multicore processor including a plurality of cores each having a memory execution unit including a plurality of walkers to perform page walks to a system memory responsive to misses in a translation lookaside buffer (TLB) of the multicore processor, and a control logic to prevent a first walker from storing a physical address portion obtained from the system memory in a paging cache when the first walker and a second walker perform concurrent page walks for a common linear address segment, wherein the first walker is to access a first paging structure using a first linear address segment and a value of a control register and to store a first accessed entry from the first paging structure in the paging cache, based on a state of a first field of a status register associated with the first walker and to access a second paging structure using the first accessed entry and a second linear address segment and to store a second accessed entry from the second paging structure in a second paging cache, based on a state of a second field of the status register associated with the first walker; and
  a dynamic random access memory (DRAM) coupled to the multicore processor, the DRAM comprising the system memory.

17. The system of claim 16, wherein the control logic is to enable a physical address portion obtained from the system memory by the second walker to be stored in the paging cache.

18. The system of claim 16, wherein the control logic is to set a plurality of fields of the status register each to indicate whether a corresponding walker of the plurality of walkers is enabled to store an obtained physical address portion in the paging cache.

19. The system of claim 16, wherein the control logic is to enable a first walker and the second walker to concurrently perform page walks and to store physical address information in the paging cache when the concurrent page walks are for different linear addresses.

* * * * *